United States Patent
Ueda et al.

(10) Patent No.: US 10,795,152 B2
(45) Date of Patent: Oct. 6, 2020

(54) OPTICAL SCANNER AND IMAGE FORMING APPARATUS

(71) Applicant: SHARP KABUSHIKI KAISHA, Sakai, Osaka (JP)

(72) Inventors: Atsushi Ueda, Sakai (JP); Atsuo Nakao, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/890,742

(22) Filed: Feb. 7, 2018

(65) Prior Publication Data
US 2018/0239130 A1   Aug. 23, 2018

(30) Foreign Application Priority Data

Feb. 17, 2017   (JP) ................. 2017-027450

(51) Int. Cl.
| | | |
|---|---|---|
| G02B 26/12 | (2006.01) | |
| G02B 7/00 | (2006.01) | |
| G03G 15/04 | (2006.01) | |
| G03G 15/043 | (2006.01) | |
| H04N 1/028 | (2006.01) | |

(52) U.S. Cl.
CPC ........... *G02B 26/123* (2013.01); *G02B 7/008* (2013.01); *G03G 15/0409* (2013.01); *G03G 15/0435* (2013.01); *G03G 15/04072* (2013.01); *H04N 1/0283* (2013.01)

(58) Field of Classification Search
None
See application file for complete search history.

(56) References Cited

U.S. PATENT DOCUMENTS

| | | | |
|---|---|---|---|
| 8,537,192 B2 * | 9/2013 | Endo | G03G 15/04072 347/237 |
| 8,736,916 B2 | 5/2014 | Ueda | |
| 2002/0039221 A1 * | 4/2002 | Shiraishi | G02B 26/123 359/204.1 |
| 2002/0051254 A1 * | 5/2002 | Kaneko | G02B 7/1825 358/509 |
| 2003/0137708 A1 | 7/2003 | Takase | |
| 2006/0164504 A1 * | 7/2006 | Kobayashi | G02B 7/008 347/233 |
| 2006/0268095 A1 * | 11/2006 | Ono | B41J 2/471 347/230 |
| 2010/0309278 A1 * | 12/2010 | Kodo | G02B 26/123 347/224 |
| 2011/0292468 A1 * | 12/2011 | Ueda | G02B 7/008 358/474 |

(Continued)

FOREIGN PATENT DOCUMENTS

| | | | | |
|---|---|---|---|---|
| JP | H0436713 | * | 2/1992 | ............ G02B 7/198 |
| JP | 2011-247989 A | | 12/2011 | |

*Primary Examiner* — Beniyam Menberu
(74) *Attorney, Agent, or Firm* — ScienBiziP, P.C.

(57) ABSTRACT

A first mirror and a second mirror are disposed on a mounting surface of a housing in an exposure device of an image forming apparatus. A back surface of the first mirror is supported by ribs and the first mirror is pressed against the ribs by elastically pressing a reflecting surface thereof by a spring member. A reflecting surface of the second mirror is supported by ribs and the second mirror is pressed against the ribs by elastically pressing a back surface thereof by a spring member.

8 Claims, 8 Drawing Sheets

(56) References Cited

U.S. PATENT DOCUMENTS

| | | | | |
|---|---|---|---|---|
| 2011/0310455 A1* | 12/2011 | Serizawa | ......... | G03G 15/04036 |
| | | | | 359/207.11 |
| 2012/0237262 A1* | 9/2012 | Matsuo | ................ | G02B 7/181 |
| | | | | 399/177 |
| 2013/0293932 A1* | 11/2013 | Sugai | .................... | H04N 1/047 |
| | | | | 358/406 |
| 2014/0211288 A1* | 7/2014 | Ohta | ..................... | G02B 7/182 |
| | | | | 359/205.1 |
| 2014/0225974 A1* | 8/2014 | Park | ................ | G03G 15/04045 |
| | | | | 347/224 |

* cited by examiner

OPTICAL SCANNER AND IMAGE FORMING APPARATUS

BACKGROUND

1. Field

The present disclosure relates to an optical scanner and an image forming apparatus, and particularly relates to an optical scanner that guides a light beam (image light) from a light source to a scanner by, for example, a plurality of mirrors, and an electrophotographic image forming apparatus using the optical scanner.

2. Description of the Related Art

An example of the related art is disclosed in Japanese Unexamined Patent Application Publication No. 2011-247989. In Japanese Unexamined Patent Appication Publication No. 2011-247989, inclination of a mirror held by a housing is suppressed even when thermal deformation occurs in the housing due to a temperature rise on image formation and thereby an error in an optical path position of image light is reduced so that occurrence of deterioration in an image forming condition is able to be avoided.

In the related art, while it is possible to suppress an optical axis fluctuation caused by the thermal deformation of the housing, a structure of a holding portion for one of the mirrors is complicated to some extent.

Therefore, the disclosure provides an optical scanner and an image forming apparatus that are novel.

The disclosure also provides an optical scanner and an image forming apparatus that are able to suppress an optical axis fluctuation caused by thermal deformation of a housing with a simplified structure.

SUMMARY

The disclosure provides an optical scanner, including a housing that is formed of thermoplastic resin and has a mounting surface, a first mirror that is mounted on the mounting surface and has a first reflecting surface which reflects a light beam and a first back surface which is opposite to the first reflecting surface, a second mirror that is mounted on the mounting surface and has a second reflecting surface which reflects the light beam reflected by the first reflecting surface and a second back surface which is opposite to the second reflecting surface, a first supporting member that is, on the mounting surface, integrally formed with the mounting surface and that supports the first mirror on the mounting surface by supporting a part of the first back surface, a second supporting member that is, on the mounting surface, integrally formed with the mounting surface and that supports the second mirror on the mounting surface by supporting a part of the second reflecting surface of the second mirror, a first elastic member that elastically presses the first reflecting surface to press the first mirror against the first supporting member, and a second elastic member that elastically presses the second back surface to press the second mirror against the second supporting member.

DESCRIPTION OF THE EMBODIMENTS

First Embodiment

Figure 1:
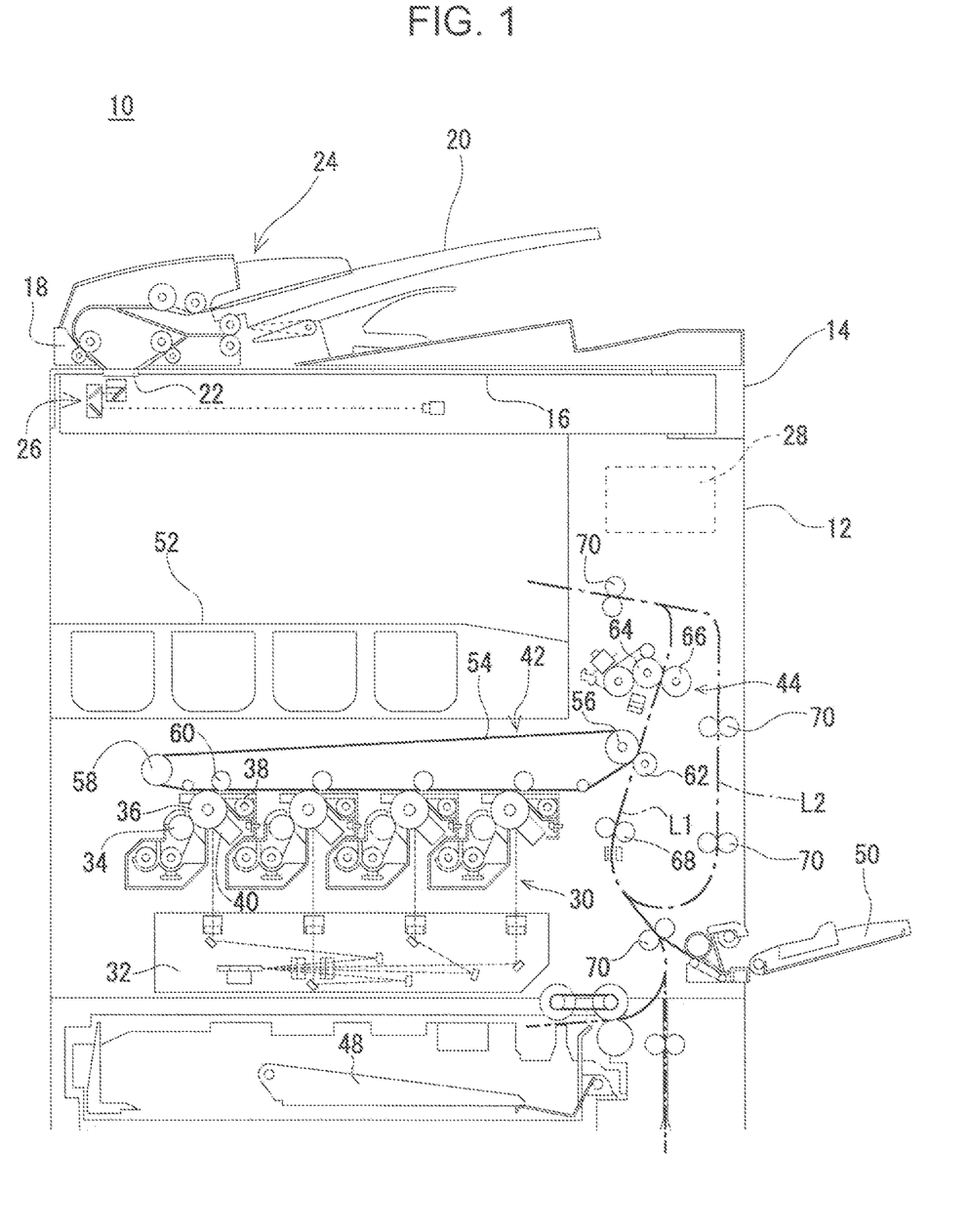
FIG. 1 is a diagram schematically illustrating an image forming apparatus to which an embodiment of the disclosure is applied.

Referring to FIG. 1, an image forming apparatus 10 that is an embodiment of the disclosure is an electrophotographic image forming apparatus that has a double-sided printing function and, by processes of charging, exposure, development, transfer, and thermal fixation, forms (prints) a multi-colored or a monochromatic image onto a sheet (recording medium).

In the embodiment, the image forming apparatus 10 is a multifunction peripheral (MFP) that has a copying function, a printer function, a scanner function, a facsimile function, and the like. However, the image forming apparatus 10 is not limited to the multifunction peripheral and may be any one of a copier, a printer, and a facsimile machine. In addition, the image forming apparatus 10 may be a color or a monochromatic image forming apparatus.

First, a basic configuration of the image forming apparatus 10 is schematically described. As illustrated in FIG. 1, the image forming apparatus 10 includes an apparatus body 12 including an image forming unit 30 and other portions, and an image reading device 14 that is arranged on an upper part of the apparatus body 12.

The image reading device 14 includes a document loading table 16 formed of a transparent material. Above the document loading table 16, a document pressing cover 18 is attached via a hinge or the like so as to be freely opened and closed. With the document pressing cover 18, an automatic document feeder (ADF) 24 by which a document loaded on a document loading tray 20 is automatically fed one by one to an image reading position 22 is provided.

An operation unit (not illustrated) including a touch panel, operation buttons, and the like for accepting an input operation such as a print start instruction by a user is provided on a front side of the document loading table 16.

An image reading unit 26 including a light source, a plurality of mirrors, an image forming lens, a line sensor, and the like is incorporated in the image reading device 14. The image reading unit 26 exposes a front surface of a document with light from the light source and guides reflected light that is reflected from the front surface of the document to the image forming lens by the plurality of mirrors. The image forming lens forms an image of the reflected light on a light receiving element of the line sensor. In the line sensor, luminance and chromaticity of the image of the reflected light formed on the light receiving element are detected and image data based on an image of the front surface of the document is generated. As the line sensor, a charge coupled device (CCD), a contact image sensor (CIS), or the like is used.

A control unit 28 including a CPU and the like, the image forming unit 30, and the like are incorporated in the apparatus body 12. The control unit 28 transmits, in accordance with the input operation or the like to the above-described operation unit, a control signal to each unit in the image forming apparatus 10, which include an exposure device (exposure unit) 32, and causes the image forming apparatus 10 to execute various operations.

The image forming unit 30 has the exposure device 32, developers 34, photoreceptor drums 36, photoreceptor cleaner units 38, chargers 40, a transfer unit 42, a fixing unit 44, and the like, forms an image on a sheet that is transported from a paper feed tray 48 or a manual paper feed tray 50, and discharges the sheet on which the image is formed to a paper discharge tray 52. As image data for forming an image on a sheet, image data that is read by the image reading unit 26, image data that is transmitted from an external computer, or the like is used.

Note that, image data used in the image forming apparatus 10 corresponds to a color image of four colors of black (K), cyan (C), magenta (M), and yellow (Y). Thus, in order to form four kinds of electrostatic latent images corresponding to the respective colors, four developers 34, four photoreceptor drums 36, four photoreceptor cleaner units 38, and four chargers 40 are provided to form four image stations.

Each of the photoreceptor drums 36 is an image carrier in which a photoreceptive layer is formed on a surface of a cylindrical base having conductivity and each of the chargers 40 is a member that charges the surface of the photoreceptor drum 36 at a predetermined potential.

Further, the exposure device 32 is configured as a laser scanning unit that includes a laser diode (LD) which is a light-emitting element, a polygon mirror 88 (refer to FIG. 2), and the like, and is arranged below the photoreceptor drums 36. The exposure device 32 exposes the surface of the charged photoreceptor drum 36 with laser light with which the rotating polygon mirror (polygon mirror) 88 performs scanning, and thereby forms an electrostatic latent image corresponding to image data on the surface of the photoreceptor drum 36. The exposure device 32 performs scanning with the laser light to expose the photoreceptor drum 36 in this manner, and therefore may be referred to also as an optical scanner.

The developers 34 make the electrostatic latent images that are formed on the photoreceptor drums 36 visible with toner of four colors (YMCK). Further, each of the photoreceptor cleaner units 38 removes toner which is residual on the surface of the photoreceptor drum 36 after development and image transfer.

The transfer unit 42 has an intermediate transfer belt 54, a driving roller 56, a driven roller 58, four intermediate transfer rollers 60, a secondary transfer roller 62, and the like, and is arranged above the photoreceptor drums 36. Note that, the transfer unit 42 does not necessarily have the intermediate transfer belt 54 and a configuration in which a toner image on the photoreceptor drum 36 is directly transferred onto a sheet may be adopted.

The intermediate transfer belt 54 is an endless belt that has flexibility and is formed of, for example, synthetic resin or rubber to which a conductive material such as carbon black is appropriately mixed. The intermediate transfer belt 54 is suspended by the driving roller 56 and the driven roller 58 and is arranged so that an outer peripheral surface thereof is in contact with outer peripheral surfaces of the photoreceptor drums 36. The intermediate transfer belt 54 circularly moves in a predetermined direction in accordance with rotational drive of the driving roller 56.

The driving roller 56 is provided so as to be rotatable around an axis thereof by a driving unit (not illustrated). The driven roller 58 rotates in accordance with circular movement of the intermediate transfer belt 54 and gives a certain tension to the intermediate transfer belt 54 so that the intermediate transfer belt 54 is not loosened.

Each of the intermediate transfer rollers 60 is arranged at a position facing a corresponding one of the photoreceptor drums 36 with the intermediate transfer belt 54 held therebetween. At a time of image formation, when a predetermined voltage (primary transfer voltage) is applied to the intermediate transfer roller 60, a transfer electric field is formed between the photoreceptor drum 36 and the intermediate transfer belt 54. By an action of the transfer electric field, a toner image formed on each of the outer peripheral surfaces of the photoreceptor drums 36 is transferred onto the outer peripheral surface of the intermediate transfer belt 54.

The secondary transfer roller 62 is provided so as to press the intermediate transfer belt 54 between the secondary transfer roller 62 and the driving roller 56. At the time of image formation, when a predetermined voltage (secondary transfer voltage) is applied to the secondary transfer roller 62, a transfer electric field is formed between the intermediate transfer belt 54 and the secondary transfer roller 62. By an action of the transfer electric field, the toner image formed on the outer peripheral surface of the intermediate transfer belt 54 is transferred (secondarily transferred) onto a sheet while the sheet passes through a transfer nip area between the intermediate transfer belt 54 and the secondary transfer roller 62.

The fixing unit 44 includes a heating roller 64 and a pressure roller 66 and is arranged above the secondary transfer roller 62. Temperature of heating roller 64 is set to be predetermined fixing temperature and, when the sheet passes through a nip area between the heating roller 64 and the pressure roller 66, the toner image transferred onto the sheet is melted, mixed, and pressed, and the toner image is thermally fixed on the sheet.

In the apparatus body 12, a first sheet transport path L1 is formed through which a sheet from the paper feed tray 48 or the manual paper feed tray 50 is transported to the paper discharge tray 52 via resist rollers 68, the secondary transfer roller 62, and the fixing unit 44. Moreover, a second sheet transport path L2 is formed through which, in a case where double-sided printing is performed on a sheet, the sheet on a front surface of which printing has been finished and which has passed through the fixing unit 44 is returned to the first sheet transport path L1 upstream of the secondary transfer roller 62 in a sheet transport direction. A plurality of transport rollers 70 for applying auxiliary propulsion force to a sheet are appropriately provided in the first sheet transport path L1 and the second sheet transport path L2.

The resist rollers 68 are also called paper stop rollers (PS rollers) and transport a sheet at a speed equal to a process speed at which the image forming unit 30 performs image formation on a sheet. For example, the resist rollers 68 wait (once stop) in a state of holding a sheet transported by the transport rollers 70 therebetween, and start transporting of the sheet in synchronism with the transfer unit 42. At this time, the resist rollers 68 are rotated at a peripheral speed equal to a peripheral speed of the intermediate transfer belt 54.

In a case where single-sided printing is performed in the apparatus body 12, a sheet is guided to the first sheet transport path L1 one by one from the paper feed tray 48 or the manual paper feed tray 50 and transported to the resist rollers 68 by the transport rollers 70. Then, the sheet is transported by the resist rollers 68 to the secondary transfer roller 62 (transfer nip section) at a timing when a leading edge of the sheet and a leading edge of image information on the intermediate transfer belt 54 are matched and a toner image is transferred onto the sheet. Thereafter, when the sheet passes through the fixing unit 44 (fixation nip section), unfixed toner on the sheet is melted and fixed by heat and the sheet is discharged onto the paper discharge tray 52.

On the other hand, in a case where double-sided printing is performed, when a rear edge of a sheet on a front surface of which printing has been finished and which has passed through the fixing unit 44 reaches the transport rollers 70 near the paper discharge tray 52, the sheet reversely travels due to the transport rollers 70 rotated reversely and is guided to the second sheet transport path L2. The sheet guided to the second sheet transport path L2 is transported through the second sheet transport path L2 by the transport rollers 70 and is guided to the first sheet transport path L1 upstream of the resist rollers 68 in a sheet transport direction. Since the front surface and a back surface of the sheet are reversed at this time, printing is thereafter performed on the back surface of the sheet when the sheet passes through the secondary transfer roller 62 and the fixing unit 44 after passing through the resist rollers 68.

Figure 2:
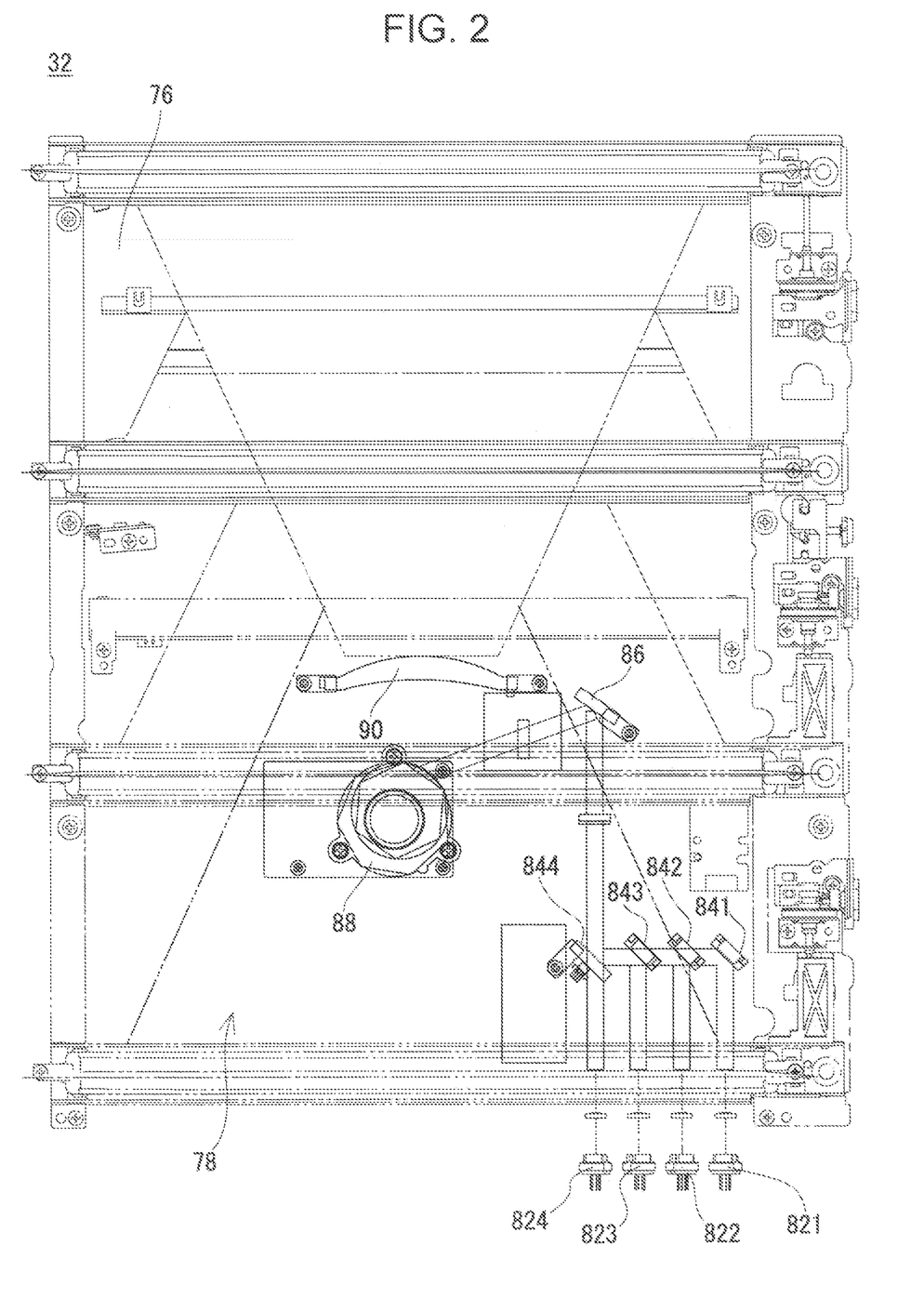
FIG. 2 is a diagram illustrating incident system mirrors and other portions disposed inside a housing in an exposure device of the embodiment of FIG. 1.
Figure 3:
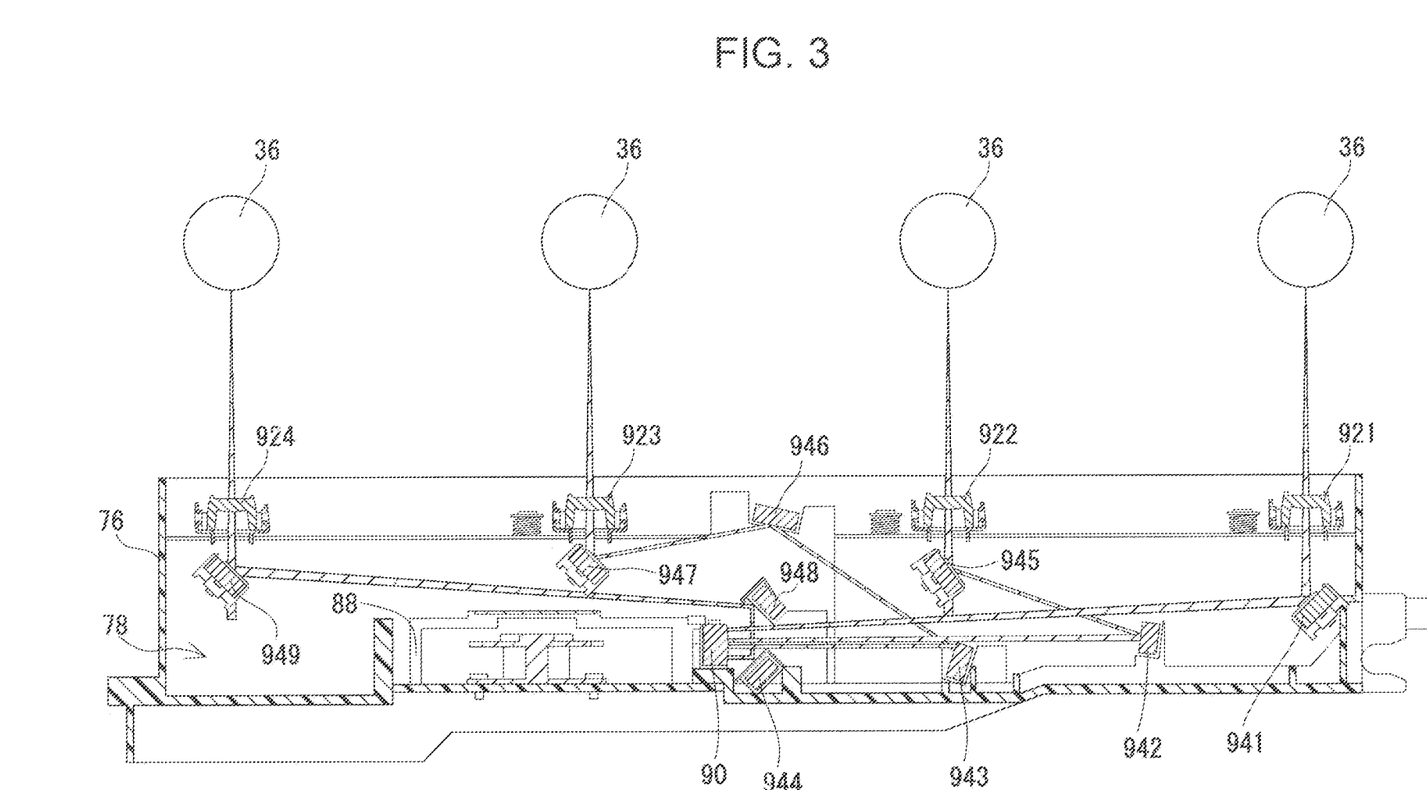
FIG. 3 is a diagram illustrating emission system mirrors and other portions disposed inside the housing in the exposure device of the embodiment of FIG. 1.
Figure 4:
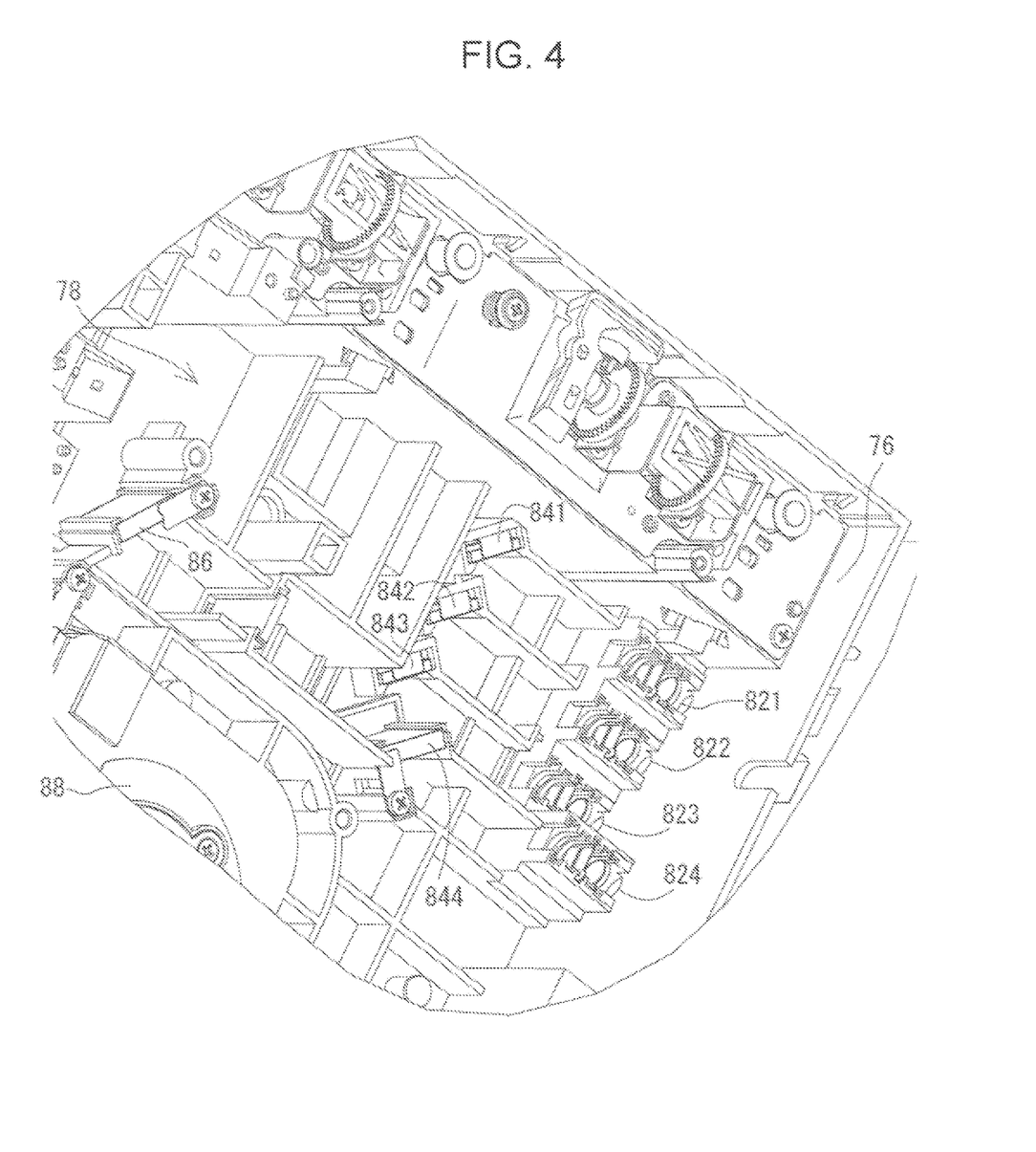
FIG. 4 is a partial perspective view illustrating a state of supporting the incident system mirrors in the housing.

As illustrated in FIG. 2 to FIG. 4, the optical scanner, that is, the exposure device 32 accommodates, in a housing 76 that is a molded article of thermoplastic resin, four light-emitting elements (laser diodes) 821 to 824, four mirrors 841 to 844, a mirror 86, the rotating polygon mirror (polygon mirror) 88, a first f-theta (fθ) lens 90, four second fθ lenses 921 to 924, and mirrors 941 to 949.

The laser diodes 821 to 824 are light-emitting elements constituting a light source, individually correspond to the respective colors of black (K), cyan (C), magenta (M), and yellow (Y), and radiate image lights modulated by image data of the respective colors. Note that, the laser diodes 821 to 824 are illustrated in FIG. 2 as being provided in an outside of the housing 76 for clarification of illustration, but are provided in an inside 78 of the housing 76 in practice as illustrated in FIG. 4.

Further, the laser diodes 821 to 824 are disposed at mutually different heights. Specifically, the laser diodes 823, 822, 821, and 824 are disposed in this order which is an ascending order of height positions thereof. Thus, optical paths for image light (light beams) emitted from the laser diodes 821 to 824 are set so as not to be overlapped in an up/down direction.

The mirrors 841 to 844 deflect the image light emitted from the laser diodes 821 to 824 toward the mirror 86. Note that, each of the mirrors 841 to 844 is disposed in accordance with a height of a corresponding one of the laser diodes 821 to 824. The mirror 86 deflects the image light, deflected by the mirrors 841 to 844, toward the polygon mirror 88. The mirrors 841 to 844 correspond to incident system optical elements and are disposed between the laser diodes 821 to 824 and the polygon mirror 88. As each of the mirrors 841 to 844 and the mirror 86, a total reflection mirror may be used or a half mirror may be used.

Specifically, the image light from the laser diode 821 is reflected by the mirror 841, passes above the mirrors 842 and 843, is further reflected by the mirror 844, and is radiated to the polygon mirror 88 via the mirror 86 that serves as a secondary reflection element.

The image light from the laser diode 822 is reflected by the mirror 842, passes above the mirror 843, is further reflected by the mirror 844, and is radiated to the polygon mirror 88 via the mirror 86.

The image light from the laser diode 823 is reflected by the mirror 843, is further reflected by the mirror 844, and is radiated to the polygon mirror 88 via the mirror 86.

The image light from the laser diode 824 passes through the mirror 844 and is radiated to the polygon mirror 88 via the mirror 86.

The polygon mirror 88 functions as a scanning unit, and deflects the image light at a constant angular velocity and scans a predetermined scanning plane with the image light. Therefore, the polygon mirror 88 has a plurality of reflecting surfaces along a circumferential surface and rotates at a constant velocity in a predetermined direction.

The first fθ lens 90 deflects, at a constant velocity, the image light deflected at the constant angular velocity by the polygon mirror 88. The second fθ lenses 921 to 924 illustrated in FIG. 3 fix each shape of the image light and distribute the image light to the respective photoreceptor drums 36 outside the housing 76.

The mirrors 941 to 949 illustrated in FIG. 3, together with the first fθ lens 90, constitute emission system optical elements and respectively guide the image light, deflected by the first fθ lens 90, to the second fθ lenses 921 to 924.

For example, the image light from the polygon mirror 88, which is deflected by the first fθ lens 90, is reflected by the mirror 941 and radiated to the corresponding photoreceptor drum 36 via the second fθ lens 921.

The image light deflected by the first fθ lens 90 is reflected by the mirrors 942 and 945, and radiated to the corresponding photoreceptor drum 36 via the second fθ lens 922.

The image light deflected by the first fθ lens 90 is reflected by the mirrors 943, 946, and 947, and radiated to the corresponding photoreceptor drum 36 via the second fθ lens 923.

The image light deflected by the first fθ lens 90 is reflected by the mirrors 944, 948, and 949, and radiated to the corresponding photoreceptor drum 36 via the second fθ lens 924.

In this manner, optical paths of the image light radiated from the laser diodes 821 to 824 and incident on the respective photoreceptor drums 36 are formed in the inside 78 of the housing 76.

As illustrated in FIG. 4 to FIG. 7, each of the mirrors 841 to 844 is held on a mounting surface 80 in the inside 78 of the housing 76 at a position where the image light emitted from a corresponding one of the laser diodes 821 to 824 is received.

Figure 5:
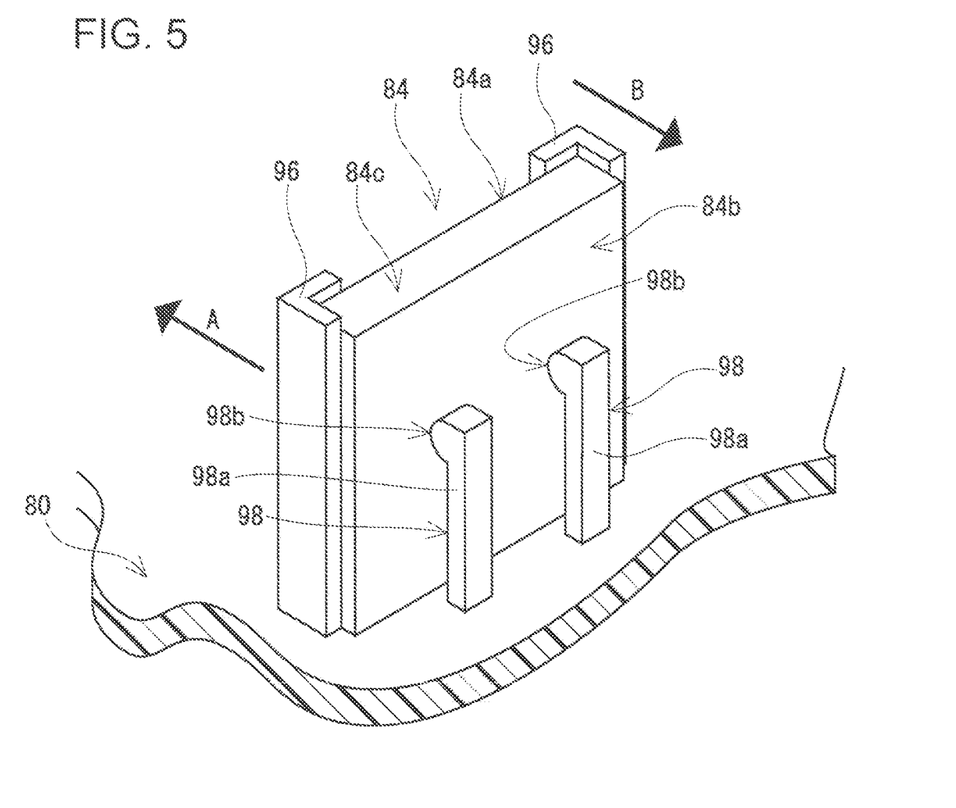
FIG. 5 is a diagram illustrating an example of the state of supporting one mirror in FIG. 4.

Here, a specific mounting structure of the mirrors 841 to 844 is described in detail particularly with reference to FIG. 5. In FIG. 5, numerals "1" to "4" of the lowest digit, each serving as a suffix, are omitted and the mirrors are simply indicated by a reference sign 84, and the same applies to ribs 96 and spring members 98.

As illustrated in FIG. 5, the mirror 84 is formed of glass having a rectangular parallelepiped shape which includes two main surfaces 84a and 84b that are front and back surfaces and a side surface 84c, and is placed on the mounting surface 80 of the housing 76 so that the side surface 84c is in contact with the mounting surface 80. That is, the mirror 84 is provided so as to stand on the mounting surface 80 in such a manner that the side surface thereof is mounted on the mounting surface 80 and the main surfaces 84a and 84b are orthogonal to the mounting surface 80.

Figure 6:
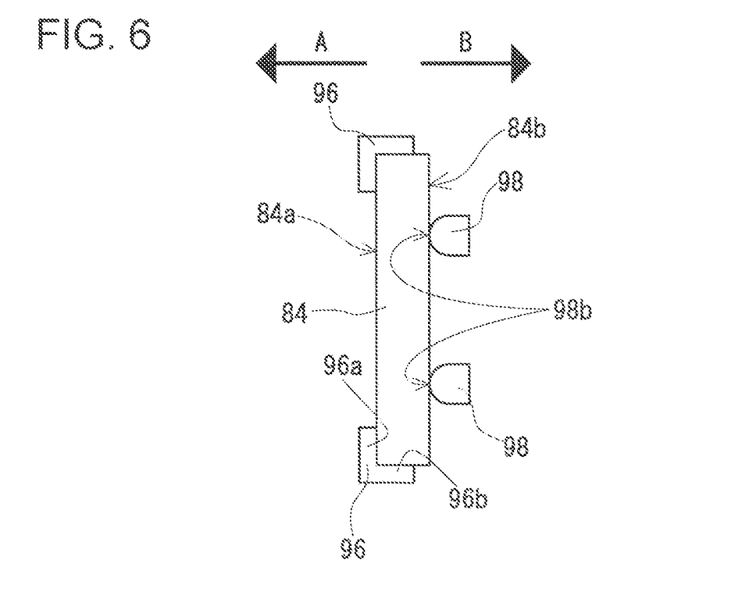
FIG. 6 is a top view illustrating the state of supporting one mirror in FIG. 5.
Figure 7:
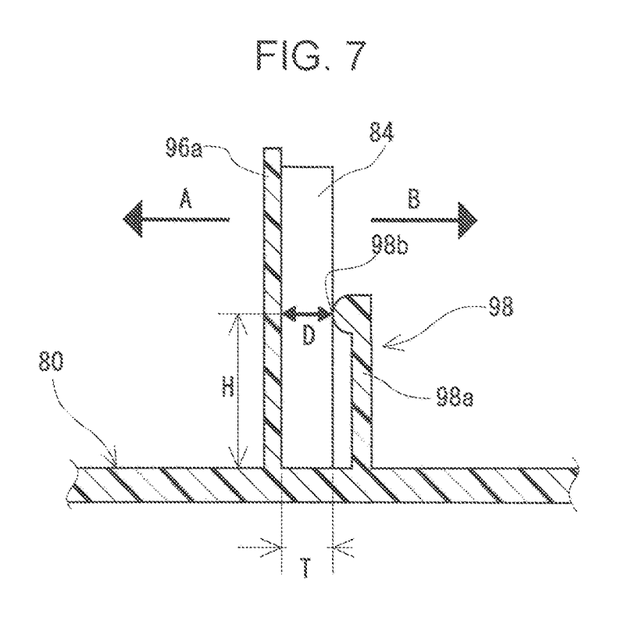
FIG. 7 is a diagram illustrating a cross section cut along a line passing through a rib and a spring member in the state of supporting one mirror in FIG. 5.

In FIG. 5 to FIG. 7, which of the two main surfaces 84a and 84b of the mirror 84 is a reflecting surface and which is the back surface (glass surface) are not particularly described, since the main surface forming the reflecting surface is determined in accordance with the mirror 84 being any one of the mirrors 841 to 844 and 86 illustrated in FIG. 2.

On a side of one main surface 84a of the mirror 84, two ribs 96 that extend upward in a vertical direction from the mounting surface 80 are provided with an interval between the two ribs 96 in a width direction (up/down direction in FIG. 6) of the mirror 84. Base ends of the ribs 96 are integrated with the mounting surface 80, and tip ends are free ends.

As easily understood, in particular, from FIG. 6 which illustrates plan view from above, each of the ribs 96 is formed in an "L" shape in plan view by two plate members 96a and 96b which are orthogonal to each other. In the embodiment, the ribs 96 are integrally molded with the mounting surface 60, i.e., the housing 76 by using thermoplastic resin. In the embodiment, a height of the rib 96 from the mounting surface 80 is equal to or higher than a height of the mirror 64 mounted in a standing state. However, the height of the rib 96 may be lower than the height of the mirror 84.

The ribs 96 are formed with an interval corresponding to a width of the mirror 84 therebetween, and each inner surface of the "L" shape supports a corner of the one main surface 84a of the mirror 84. That is, the plate members 96a respectively support ends in the width direction of the one main surface 84a of the mirror 84 and the two plate members 96b facing each other hold and support side surfaces of the mirror 84 therebetween. However, the plate members 96b at the side surfaces of the ribs 96 are not illustrated in FIG. 7.

The mirror 84 is an incident system optical element as described above and therefore it is desired that the ribs 96 be provided so as not to obstruct transmission or reflection of image light in the mirror 84 and secure an optical path of image light. Thus, only side ends of the mirror 84 are supported by the ribs 96. That is, rib 96 is not provided at a center of the mirror 84 in the width direction.

If a contact area between the plate members 96a and the one main surface 84a of the mirror 84 is increased by increasing the size of the plate members 96a, the ribs 96 are able to strongly support the mirror 84, and therefore it is desirable to make the plate members 96a as large as possible under a restriction that the optical path is not blocked.

Moreover, in the embodiment, two spring members 98 that extend upward from the mounting surface 80 are integrally formed with the mounting surface 80, i.e., the housing 76 by using thermoplastic resin, and the spring members 98 elastically press the other main surface 84b of the mirror 84. The spring members 98 function as elastic members that press the other main surface 84b of the mirror 84 against the one main surface 84a side with elasticity.

The spring members 98 are formed on the other main surface 84b side of the mirror 84 with an interval therebetween in the width direction of the mirror 84 so as to avoid the optical path described above. Each of the spring members 98 includes an elasticity imparting portion 98a that is formed to extend upward from the mounting surface 80 and a contact portion 98b that is formed at a tip end of the elasticity imparting portion 98a, has a vertical cross section in a semicircle shape, and protrudes toward the mirror 84 (FIG. 7). The elasticity imparting portion 98a imparts elastic force to the contact portion 98b at the tip end, for example, in a direction of an arrow A illustrated in FIG. 7, that is, in a direction toward the mirror 84.

In the embodiment, in a case where T denotes a thickness of the mirror 84 illustrated in FIG. 7, a distance D between an inner surface of the plate member 96a of the rib 96 and a contact point of the contact portion 98b when the mirror 84 is not mounted is set to be smaller than the thickness T. Accordingly, when the mirror 84 is inserted into a space between the plate member 96a and the contact portion 98b, the contact portion 98b is pressed in a direction of an arrow B by the other main surface 84b of the mirror 84. The pressing force applies external force (bending) to the elasticity imparting portion 98a, and thus the contact portion 98b is able to exert the elasticity.

In addition, spring force, that is, the elastic force of the spring member 98 is determined by a height H from the mounting surface 80 to the contact portion 98b, which is illustrated in FIG. 7, and a thickness (rigidity) of the elasticity imparting portion 98a, and therefore the height H and the thickness are desired to be optimal. Basically, the height H depends on a length (height) of the elasticity imparting portion 98a, and therefore it is possible to obtain optimum elasticity by adjusting the length and the thickness of the elasticity imparting portion 98a.

In the embodiment, the contact portions 98b are formed to have the vertical cross section in the semicircle shape that protrudes toward the mirror 84 and thereby the contact portions 98b are in contact with the other main surface 84b of the mirror 84 on a line extending in a direction parallel to the mounting surface 80. Further, in the embodiment, the position on the other main surface 84b of the mirror 84 in a height direction, which is pressed by the contact portions 98b, is set to be at an intermediate position of the height of the mirror 84.

As described above, the mirror 84 is held by the ribs 96 (plate members 96a) and the spring members 98 in a thickness direction. Additionally, movement of the mirror 84 in the width direction is restricted by the plate members 96b of the ribs 96.

The mirrors 841 to 844 and 86 illustrated in FIG. 2 are provided on the same surface of the mounting surface 80 of the housing 76 by using such a mounting structure of the mirrors.

Figure 8:
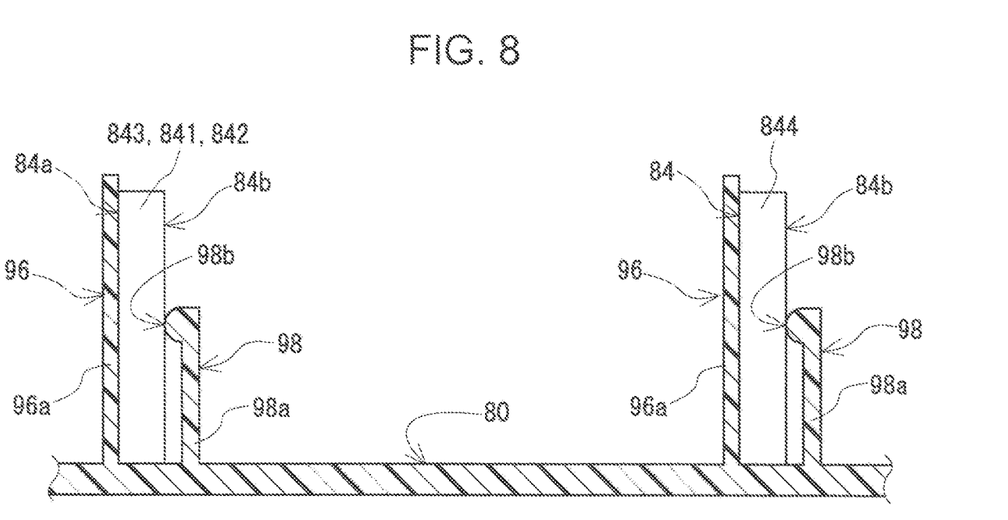
FIG. 8 is a diagram illustrating a cross section cut along a line passing through ribs and spring members similarly to FIG. 7, in a state of supporting a first mirror and a second mirror on a mounting surface of the housing.

In an example of arrangement illustrated in FIG. 8, a mirror on the left side is, for example, the mirror 843 (or 842 or 841) illustrated in FIG. 2, and a mirror on the right side is, for example, the mirror 844 illustrated in FIG. 2. As described above, the mirror 843 reflects laser light from the laser diode 823 and radiates the laser light to a reflecting surface of the mirror 844. That is, in the example, a light beam reflected by a reflecting surface of the mirror 843 is incident on the reflecting surface of the mirror 844. Thus, the mirror 843 functions as a first mirror and the mirror 844 functions as a second mirror. That is, the first mirror is a mirror farther from the polygon mirror 88 and the second mirror is a mirror closer to the polygon mirror 88.

In the example, the mirror 843 is arranged so that the other main surface 84b illustrated in, for example, FIG. 5 serves as the reflecting surface. The mirror 844 is arranged so that the one main surface 84a illustrated in, for example, FIG. 5 serves as the reflecting surface. Accordingly, a glass surface of the mirror 843 is supported by the ribs 96 and the spring members 98 elastically press the mirror 843 from the reflecting surface side toward the ribs 96. On the other hand, the reflecting surface of the mirror 844 is supported by the ribs 96 and the spring members 98 elastically press the mirror 844 from a glass surface side toward the ribs 96.

In the embodiment, heights of the ribs 96 each serving as a supporting member of the mirror are set to be equal. The heights of the ribs 96 are set to be slightly higher than that of the mirror 84 as illustrated in FIG. 5.

A relationship between which surface of a mirror the ribs 96 support and which surface the spring members 98 press is similarly satisfied also in a case where the first mirror is the mirror 841 and the second mirror is the mirror 844. In this case, however, light reflected by the mirror 841 passes over the mirrors 842 and 843 and reaches the reflecting surface of the mirror 844. In a case where the first mirror is the mirror 842 and the second mirror is the mirror 844, light reflected by the mirror 842 passes over the mirror 843 and reaches the reflecting surface of the mirror 844.

Such a relationship between the first mirror and the second mirror is applicable to a relationship between the mirror 844 and the mirror 86, and, also in this case, the reflecting surface of the mirror 844 serving as the first mirror is supported by the ribs 96 and the spring members 98 elastically press the mirror 844 from the glass surface side against the reflecting surface side. On the other hand, a glass surface of the mirror 86 is supported by the ribs 96 and the spring members 98 elastically press the mirror 86 from a reflecting surface side against the glass surface side.

Figure 9:
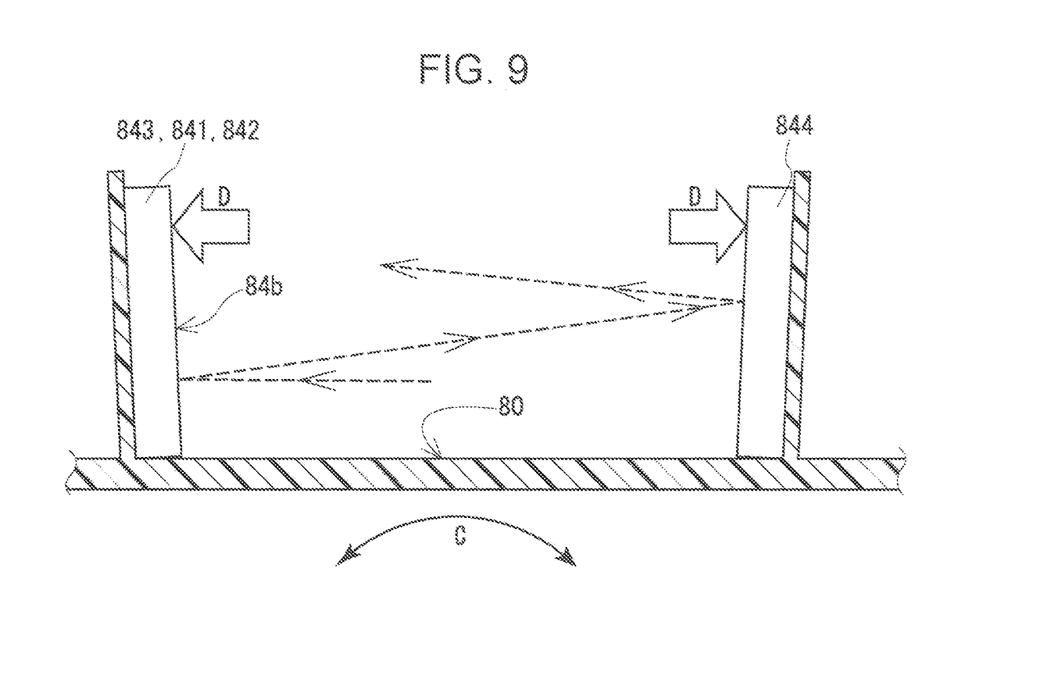
FIG. 9 is a diagram illustrating a state where the mounting surface is curved in a state of supporting the first mirror and the second mirror on the mounting surface of the housing by a conventional supporting method.

Here, an effect of the embodiment is described also with reference to FIG. 9. Two mirrors 843 and 844 are provided on the same mounting surface 80. The mounting surface 80 is a part of the housing 76 that is injection-molded by using thermoplastic resin. As described above, the polygon mirror 88 (FIG. 2) and the like are accommodated in the inside of the housing 76. As well known, the polygon mirror 88 generates heat from a motor while operating, thereby causing thermal deformation of the housing 76. Thus, the mounting surface 80 is also deformed and a flat surface thereof becomes non-flat.

For example, in a case where the mounting surface 80 is curved as indicated by an arrow C of FIG. 9, when it is assumed that both the mirrors 843 and 844 are supported by a conventional method, both the mirrors 843 and 844 are inclined outward (to back surface sides) as indicated by outlined arrows D, and an optical axis of each of the mirrors 843 and 844 fluctuates, and therefore an optical axis fluctuation with respect to the polygon mirror 88 becomes large. Accordingly, a radiation position on each of the photoreceptor drums 36, which receives image light, largely deviates. In a worst case, there is a possibility that a light beam deviates from a reflecting surface of the polygon mirror 88 (vignetting occurs).

Figure 10:
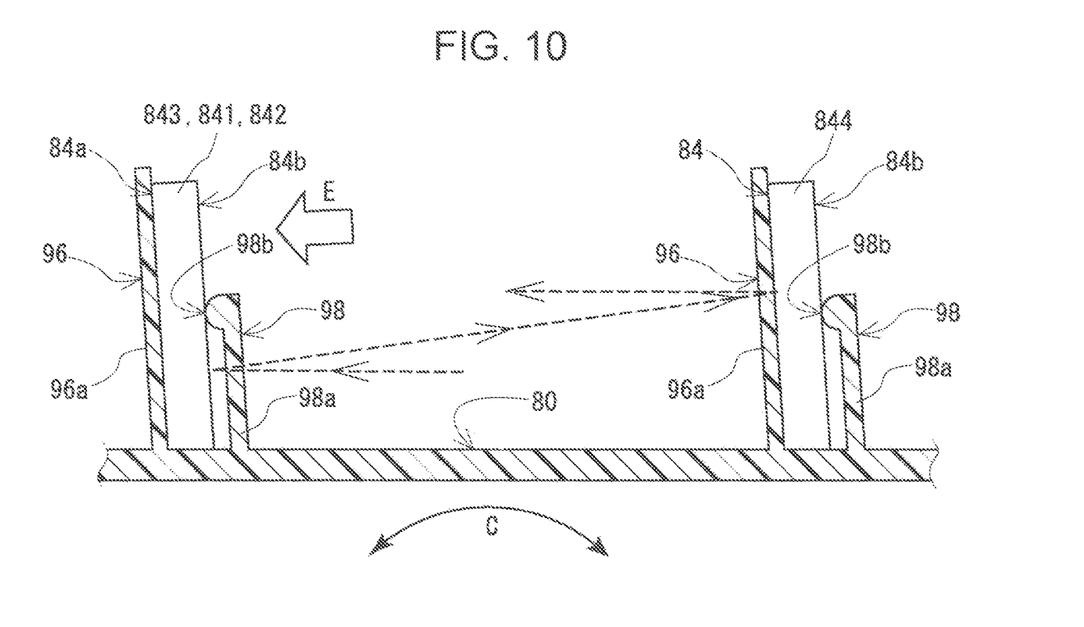
FIG. 10 is a diagram illustrating a state where the mounting surface is curved in a state of supporting the first mirror and the second mirror on the mounting surface of the housing by a supporting method of the embodiment of FIG. 8.

On the other hand, in the embodiment illustrated in FIG. 8, a case where a curve of the mounting surface 80 occurs as indicated by the arrow C in FIG. 10 is assumed. The mirror 843 on the left side is inclined outward (to the left side) in a direction indicated by an outlined arrow E in FIG. 10 in cooperation with the elasticity of the spring members 98, which is applied to the reflecting surface of the mirror 843. On the other hand, the mirror 844 on the right side is to be inclined in a direction of the arrow D in FIG. 9 in accordance with the curve of the mounting surface 80 similarly to the case of FIG. 9, but the mirror 844 is pressed with the elasticity of the spring members 98 from the right, that is, from the glass surface side, so that the mirror 844 is also inclined in the direction of the arrow E (reflecting surface side) due to the elastic force. Alternatively, even when the mirror 844 is not inclined in the direction of the arrow E, it is possible to suppress the inclination in the direction of the arrow D (back surface side) of FIG. 9 as much as possible. Therefore, the deviation of the optical axis between the two mirrors described with FIG. 9 is minimized.

That is, in the case where mirrors are supported by the conventional method illustrated in FIG. 9, when the mounting surface 80 is curved, the first mirror and the second mirror are inclined in directions separating from each other (outward) and thereby the optical axis largely fluctuates between the first mirror and the second mirror. On the other hand, in the embodiment illustrated in FIG. 8, in the case where the mounting surface 80 is curved, similarly to the conventional method, the first mirror is inclined outward (to the back surface side), but the second mirror is inclined in the same direction as the first mirror (to the reflecting surface side), or even when the second mirror is not inclined in the direction, it is possible to avoid the outward inclination (to the back surface side). Accordingly, it is possible to avoid inclination of the first mirror and the second mirror in the directions separating from each other. Thus, it is possible to suppress deviation of an optical axis between the first mirror and the second mirror.

Second Embodiment

In the embodiment illustrated in FIG. 8, the heights of the ribs 96 that support the first mirror, for example, the mirror 843 and the heights of the ribs 96 that support the second mirror, for example, the mirror 844 are set to be the same. However, in a second embodiment illustrated in FIG. 11, the heights of the ribs 96 of the mirror closer to the polygon mirror 88 serving as a scanner are set to be low and the heights of the ribs 96 of the mirror farther from the polygon mirror 88 are set to be high. For example, in a case where the first mirror is the mirror 843 and the second mirror is the mirror 844, the heights of the ribs 96 that are supporting members of the mirror 843 are set to be high and the heights of the ribs 96 of the mirror 844 are set to be low. Similarly, also in a case where the first mirror is the mirror 844 and the second mirror is the mirror 86, the heights of the ribs 96 of the mirror 86 are set to be lower.

Figure 11:
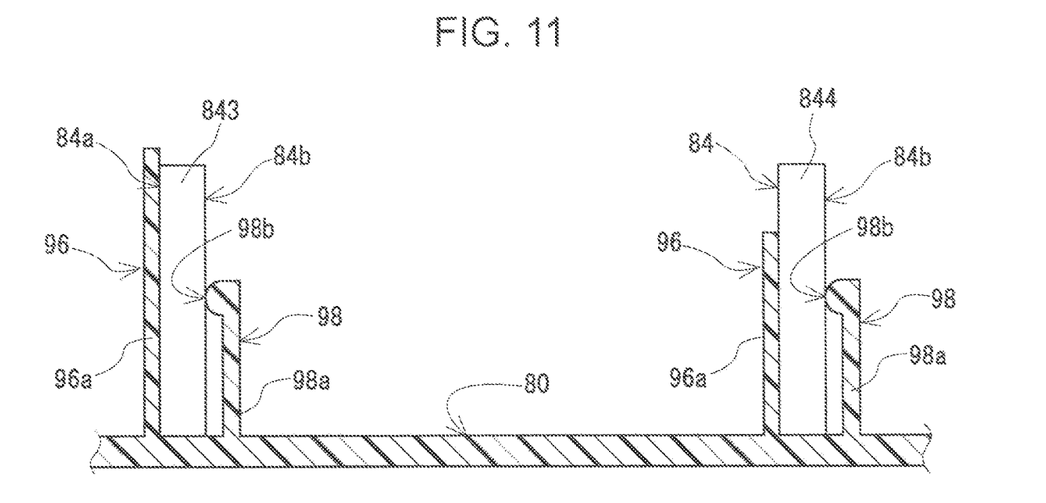
FIG. 11 is a diagram illustrating a cross section similar to FIG. 8, in which a first mirror and a second mirror of a second embodiment of the disclosure are arranged.

The height of the rib 96 affects an inclination amount of a mirror supported by the rib 96 on the thermal deformation of the housing 76, and when the height of the rib 96 is low, the inclination amount occurred on the thermal deformation is able to be reduced. A displacement amount at a tip end of the rib 96 on the thermal deformation is smaller as the height of the rib 96 is lower, so that it is possible to reduce the inclination amount of the second mirror, for example, the mirror 86 of which the height of the rib 96 is low.

The reason why the inclination amount of the second mirror that is closer to the polygon mirror 88 is set to be smaller than that of the first mirror is that, first, temperature is higher as being closer to the polygon mirror 88 and the second mirror is inclined more easily compared to the first mirror, when the first mirror and the second mirror have the same structure. Another reason is that the second mirror closer to the polygon mirror 88 has more light beams (image light) to reflect compared to the first mirror. In other words, the inclination of the second mirror affects optical axes of all light beams incident on the second mirror, and thus the inclination amount of the second mirror is desired to be smaller.

Third Embodiment

In the embodiment illustrated in FIG. 8, the first mirror, for example, the mirror 843 and the second mirror, for example, the mirror 844 are described as having the same heights. In practice, sizes of the mirrors are set so that the size of the second mirror that is closer to the polygon mirror 88 serving as the scanner is set to be larger than that of the first mirror that is farther from the polygon mirror 88. This is because the second mirror closer to the polygon mirror 88 has more light beams (image light) to reflect compared with the first mirror and therefore is desirable to have a larger area.

Figure 12:
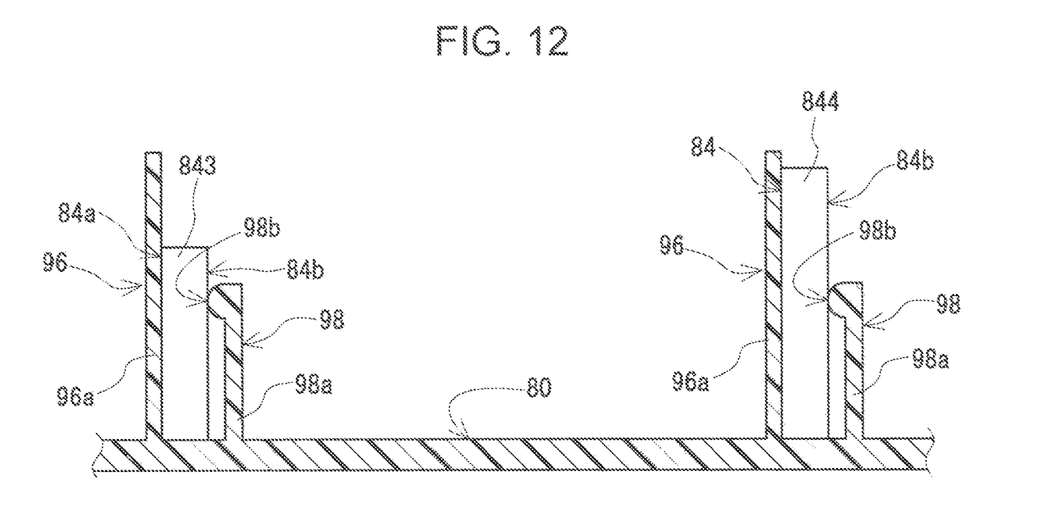
FIG. 12 is a diagram illustrating a cross section similar to FIG. 8, in which a first mirror and a second mirror of a third embodiment of the disclosure are arranged.

In a third embodiment illustrated in FIG. 12, for such a reason, sizes of the first mirror, for example, the mirror 843 and the second mirror, for example, the mirror 844 are made different. However, the heights of the ribs 96 that are the supporting members of the mirrors are the same between the first mirror and the second mirror.

As described above, though the height of the rib 96 affects an inclination amount of a mirror, in a case where the heights of the ribs 96 are set to be the same even when sizes of mirrors are made different as described in the third embodiment, it is possible that inclination amounts of the first mirror and the second mirror are set to be the same and that deviation of optical axes of light beams on thermal deformation of the housing 76 is set to be the same degree between the mirrors.

Note that, in the embodiments described above, though the spring member 98 that is integrally formed with the mounting surface 80 is used as an elastic member, the elastic member is not necessarily integrally formed with the mounting surface 80, and a leaf spring provided separately may be used. In this case, the leaf spring is able to be arranged to press a vicinity of an upper end of the mirror.

The present disclosure contains subject matter related to that disclosed in Japanese Priority Patent Application JP 2017-027450 filed in the Japan Patent Office on Feb. 17, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An optical scanner, comprising:
    a housing that is formed of thermoplastic resin and has a mounting surface;
    a first mirror that is mounted on the mounting surface and has a first reflecting surface which reflects a light beam and a first back surface which is opposite to the first reflecting surface;
    a second mirror that is mounted on the mounting surface and has a second reflecting surface which reflects the light beam reflected by the first reflecting surface and a second back surface which is opposite to the second reflecting surface;
    a first support member that is integrally formed with the mounting surface and that supports the first mirror on the mounting surface by supporting a part of the first back surface;
    a second support member that is integrally formed with the mounting surface and that supports the second mirror on the mounting surface by supporting a part of the second reflecting surface of the second mirror;
    a first elastic member that is integrally formed with the mounting surface and that elastically presses the first reflecting surface of the first mirror against the first support member by elastically pressing the first reflecting surface;
    a second elastic member that is integrally formed with the mounting surface and that elastically presses the second back surface of the second mirror against the second support member by elastically pressing the second back surface, wherein the first and second support members and the first and second elastic members extend from the mounting surface in a vertical direction;
    a light-emitter that emits the light beam toward the first mirror; and
    a rotating polygon mirror that performs scanning with the light beam from the light-emitter,
    wherein
    the first mirror and the second mirror are provided in an optical path between the light-emitter and the rotating polygon mirror,
    the second mirror is closer to the rotating polygon mirror than the first mirror is, and
    a height of the second support member is smaller than a height of the first support member in the vertical direction.

2. The optical scanner according to claim 1, wherein the first support member includes two ribs that are formed integrally with the mounting surface with an interval between the two ribs in a width direction of the first mirror and that support both ends in a width direction of the first back surface of the first mirror, and the second support member includes two ribs that are formed integrally with the mounting surface with an interval between the two ribs in a width direction of the second mirror and that support both ends in a width direction of the second reflecting surface of the second mirror.

3. The optical scanner according to claim 1, wherein the first elastic member includes an elasticity imparting portion that is integrally formed with the mounting surface, extends upward from the mounting surface, and has a predetermined height, and a contact portion that protrudes at an upper end of the elasticity imparting portion in a direction of the first reflecting surface of the first mirror, and the second elastic member includes an elasticity imparting portion that is integrally formed with the mounting surface, extends upward from the mounting surface, and has a predetermined height, and a contact portion that protrudes at an upper end of the elasticity imparting portion in a direction of the second back surface of the second mirror.

4. An image forming apparatus, comprising the optical scanner according to claim 1.

5. An optical scanner, comprising:
a housing that is formed of thermoplastic resin and has a mounting surface;
a first mirror that is mounted on the mounting surface and has a first reflecting surface which reflects a light beam and a first back surface which is opposite to the first reflecting surface;
a second mirror that is mounted on the mounting surface and has a second reflecting surface which reflects the light beam reflected by the first reflecting surface and a second back surface which is opposite to the second reflecting surface;
a first support member that is integrally formed with the mounting surface and that supports the first mirror on the mounting surface by supporting a part of the first reflecting surface;
a second support member that is integrally formed with the mounting surface and that supports the second mirror on the mounting surface by supporting a part of the second back surface of the second mirror;
a first elastic member that is integrally formed with the mounting surface and that elastically presses the first back surface of the first mirror against the first support member;
a second elastic member that is integrally formed with the mounting surface and that elastically presses the second reflecting surface of the second mirror against the second support member, wherein the first and second support members and the first and second elastic members extend from the mounting surface in a vertical direction;
a light-emitter that emits the light beam toward the first mirror; and
a rotating polygon mirror that performs scanning with a light beam from the light-emitter,
wherein
the first mirror and the second mirror are provided in an optical path between the light-emitter and the rotating polygon mirror,
the second mirror is closer to the rotating polygon mirror than the first mirror is, and
a height of the second support member is smaller than a height of the first support member in the vertical direction.

6. The optical scanner according to claim 5, wherein
the first support member includes two ribs that are formed integrally with the mounting surface with an interval between the two ribs in a width direction of the first mirror and that support both ends in a width direction of the first reflecting surface of the first mirror, and
the second support member includes two ribs that are formed integrally with the mounting surface with an interval between the two ribs in a width direction of the second mirror and that support both ends in a width direction of the second back surface of the second mirror.

7. The optical scanner according to claim 5, wherein
the first elastic member includes an elasticity imparting portion that is integrally formed with the mounting surface, extends upward from the mounting surface, and has a predetermined height, and a contact portion that protrudes at an upper end of the elasticity imparting portion in a direction of the first back surface of the first mirror, and
the second elastic member includes an elasticity imparting portion that is integrally formed with the mounting surface, extends upward from the mounting surface, and has a predetermined height, and a contact portion that protrudes at an upper end of the elasticity imparting portion in a direction of the second reflecting surface of the second mirror.

8. An image forming apparatus, comprising the optical scanner according to claim 5.

* * * * *